US009435695B2

(12) United States Patent
Mansfield (10) Patent No.: US 9,435,695 B2
(45) Date of Patent: Sep. 6, 2016

(54) METHOD AND APPARATUS FOR DETERMINING A TEMPERATURE OF A VIBRATING SENSOR COMPONENT OF A VIBRATING METER

(75) Inventor: William M Mansfield, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 406 days.

(21) Appl. No.: 13/809,334

(22) PCT Filed: Aug. 2, 2010

(86) PCT No.: PCT/US2010/044071
§ 371 (c)(1),
(2), (4) Date: Jan. 9, 2013

(87) PCT Pub. No.: WO2012/018323
PCT Pub. Date: Feb. 9, 2012

(65) Prior Publication Data
US 2013/0121376 A1 May 16, 2013

(51) Int. Cl.
*G01K 1/08* (2006.01)
*G01K 7/00* (2006.01)
*G01K 7/36* (2006.01)
*G01F 1/84* (2006.01)
*G06F 17/00* (2006.01)

(52) U.S. Cl.
CPC .............. *G01K 7/00* (2013.01); *G01F 1/8431* (2013.01); *G01F 1/8436* (2013.01); *G01K 7/36* (2013.01); *G06F 17/00* (2013.01)

(58) Field of Classification Search
USPC ........................................ 73/861.354, 54.41
See application file for complete search history.

(56) References Cited

U.S. PATENT DOCUMENTS

| 4,660,421 | A | * | 4/1987 | Dahlin | ................. | G01F 1/8422 |
| | | | | | | 73/861.356 |
| 5,987,998 | A | * | 11/1999 | Campbell | ............ | G01F 1/8413 |
| | | | | | | 73/861.355 |
| 6,230,104 | B1 | | 5/2001 | Shelley et al. | | |
| 7,000,465 | B1 | * | 2/2006 | L'Bassi | ................ | G01F 1/6847 |
| | | | | | | 73/204.27 |
| 7,550,979 | B2 | * | 6/2009 | Zhou et al. | ................... | 324/693 |
| 7,950,292 | B2 | * | 5/2011 | Harada et al. | ............. | 73/861.12 |

(Continued)

FOREIGN PATENT DOCUMENTS

| CA | 2301620 A1 * 4/1999 | ........... G01F 1/8413 |
| JP | 11351944 A | 12/1999 |

(Continued)

OTHER PUBLICATIONS

Micro Motion, Inc, Refining, State-of-the-Art Lube Oil Blending with Micro Motion Coriolis Flowmeters, AN-00341, 2005.

*Primary Examiner* — Lisa Caputo
*Assistant Examiner* — Nasir U Ahmed
(74) *Attorney, Agent, or Firm* — The Ollila Law Group LLC (57) ABSTRACT

A method for determining a temperature of a vibrating sensor component (204A, 205A, 205'A) coupled to a conduit (203A, 203B) of a vibrating meter (200) is provided. The method comprises a step of supplying the vibrating sensor component (204A, 205A, 205'A) with a temperature determination signal (313). The method also comprises a step of measuring a resulting signal (314). The method further comprises a step of determining a temperature of the sensor component (204A, 205A, 205'A) based on the temperature determination signal (313) and the resulting signal (314).

24 Claims, 7 Drawing Sheets

(56) References Cited

U.S. PATENT DOCUMENTS

| | | |
|---|---|---|
| 2003/0235233 A1 | 12/2003 | Kawakatsu |
| 2005/0125167 A1 | 6/2005 | Lesjak et al. |
| 2005/0229714 A1* | 10/2005 | Willigen ............... G01F 1/60 73/861.12 |
| 2006/0179895 A1 | 8/2006 | Thorn et al. |
| 2007/0186683 A1* | 8/2007 | Smith ................ G01F 1/8436 73/861.354 |
| 2007/0213945 A1* | 9/2007 | Tombs ........................... 702/54 |
| 2008/0297173 A1 | 12/2008 | Zhou et al. |
| 2009/0265066 A1* | 10/2009 | Ogawa ................. F16H 61/12 701/55 |
| 2010/0188064 A1* | 7/2010 | Mansfield ............ G01F 1/8413 323/299 |
| 2010/0268484 A1* | 10/2010 | Shimada ............... G01F 1/8431 702/45 |
| 2010/0326204 A1* | 12/2010 | Wang ................... G01F 1/8436 73/861.355 |

FOREIGN PATENT DOCUMENTS

| | | |
|---|---|---|
| RU | 2344376 C1 | 1/2009 |
| WO | 2006041427 A1 | 4/2006 |
| WO | 2012067608 | 5/2012 |

* cited by examiner

METHOD AND APPARATUS FOR DETERMINING A TEMPERATURE OF A VIBRATING SENSOR COMPONENT OF A VIBRATING METER

TECHNICAL FIELD

The present invention relates to, vibrating meters, and more particularly, to a method and apparatus for determining a temperature of a vibrating sensor component of a vibrating meter.

BACKGROUND OF THE INVENTION

Vibrating sensors, such as for example, vibrating densitometers and Coriolis flow meters are generally known and are used to measure mass flow and other information for materials within a conduit. The material may be flowing or stationary. Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter from a connected pipeline on the inlet side of the flow meter, is directed through the conduit(s), and exits the flow meter through the outlet side of the flow meter. The natural vibration modes of the vibrating, material filled system are defined in part by the combined mass of the conduits and the material flowing within the conduits.

When there is no flow through the flow meter, a driving force applied to the conduit(s) causes all points along the conduit(s) to oscillate with identical phase or a small "zero offset", which is a time delay measured at zero flow. As material begins to flow through the flow meter, Coriolis forces cause each point along the conduit(s) to have a different phase. For example, the phase at the inlet end of the flow meter lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the time delay between the pick-off sensors. The time delay between the two or more pick-off sensors is proportional to the mass flow rate of material flowing through the conduit(s).

Meter electronics connected to the driver generates a drive signal to operate the driver and determines a mass flow rate and other properties of a material from signals received from the pick-off sensors. The driver may comprise one of many well-known arrangements; however, a magnet and an opposing drive coil have received great success in the vibrating meter industry. Examples of suitable drive coil and magnet arrangements are provided in U.S. Pat. No. 7,287,438 as well as U.S. Pat. No. 7,628,083, which are both assigned on their face to Micro Motion, Inc. and are hereby incorporated by reference. An alternating current is passed to the drive coil for vibrating the conduit(s) at a desired flow tube amplitude and frequency. It is also known in the art to provide the pick-off sensors as a magnet and coil arrangement very similar to the driver arrangement. However, while the driver receives a current, which induces a motion, the pick-off sensors can use the motion provided by the driver to induce a voltage. The magnitude of the time delay measured by the pick-off sensors is very small; often measured in nanoseconds. Therefore, it is necessary to have the transducer output be very accurate.

Figure 1:
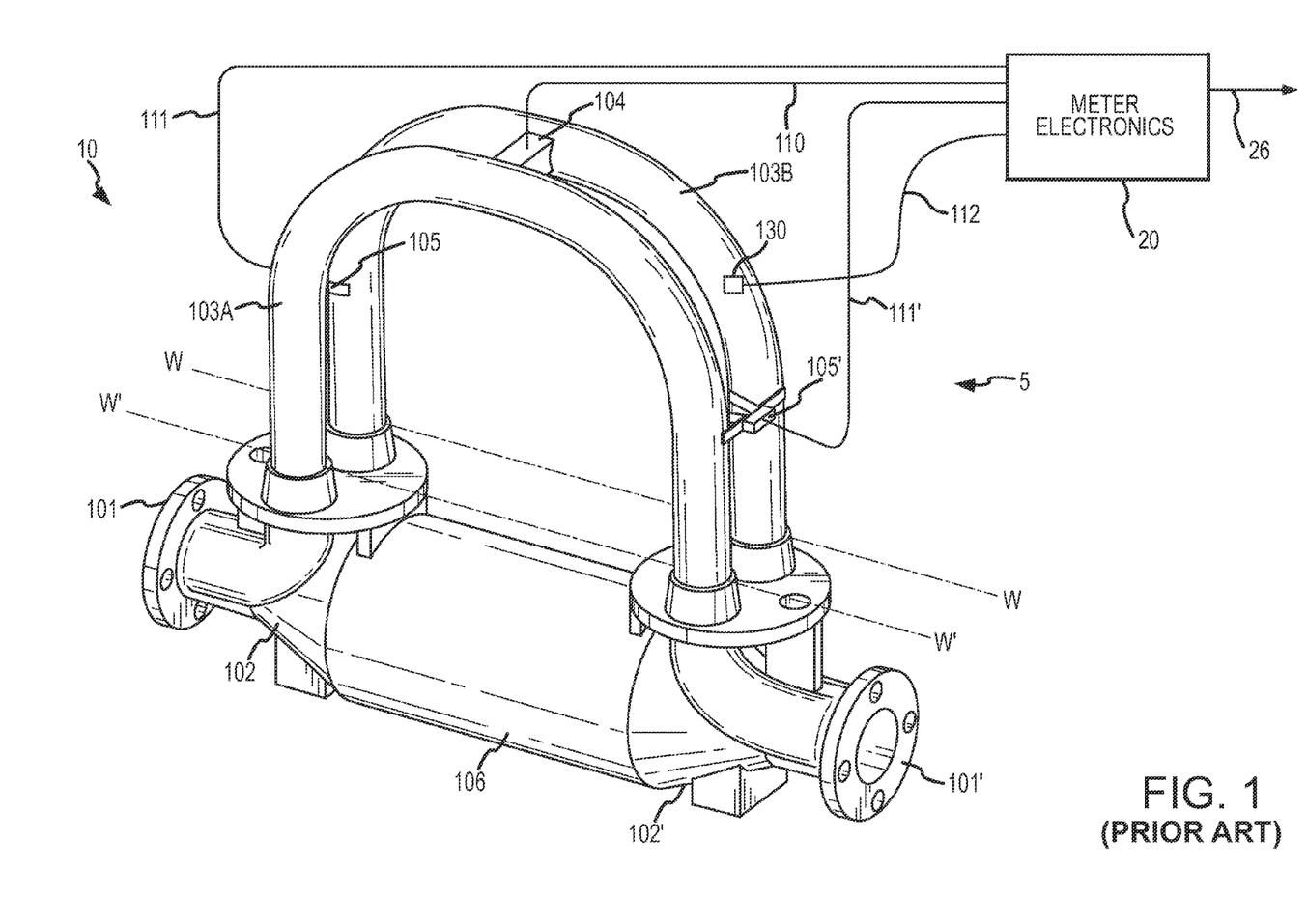
FIG. 1 shows a prior art Coriolis sensor assembly.

FIG. 1 illustrates an example of a prior art vibrating sensor assembly 5 in the form of a Coriolis flow meter comprising a flow meter 10 and a meter electronics 20. The meter electronics 20 is connected to the flow meter 10 to measure characteristics of a flowing material, such as, for example, density, mass flow rate, volume flow rate, totalized mass flow, temperature, and other information.

The flow meter 10 includes a pair of flanges 101 and 101', manifolds 102 and 102', and conduits 103A and 103B. Manifolds 102, 102' are affixed to opposing ends of the conduits 103A, 103B. Flanges 101 and 101' of the prior art Coriolis flow meter are affixed to opposite ends of the spacer 106. The spacer 106 maintains the spacing between manifolds 102, 102' to prevent undesired vibrations in the conduits 103A and 103B. The conduits 103A and 103B extend outwardly from the manifolds in an essentially parallel fashion. When the flow meter 10 is inserted into a pipeline system (not shown) which carries the flowing material, the material enters flow meter 10 through flange 101, passes through the inlet manifold 102 where the total amount of material is directed to enter conduits 103A and 103B, flows through the conduits 103A and 103B and back into the outlet manifold 102' where it exits the flow meter 10 through the flange 101'.

The prior art flow meter 10 includes a driver 104. The driver 104 is affixed to conduits 103A and 103B in a position where the driver 104 can vibrate the conduits 103A, 103B in the drive mode, for example. More particularly, the driver 104 includes a first driver component (not shown) affixed to the conduit 103A and a second driver component (not shown) affixed to the conduit 103B. The driver 104 may comprise one of many well-known arrangements such as a coil mounted to the conduit 103A and an opposing magnet mounted to the conduit 103B.

In the present example of the prior art Coriolis flow meter, the drive mode is the first out of phase bending mode and the conduits 103A, 103B are selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by the meter electronics 20, such as for example via pathway 110, and passed through the coil to cause both conduits 103A, 103B to oscillate. Those of ordinary skill in the art will appreciate that other drive modes may be used by the prior art Coriolis flow meter.

The flow meter 10 shown includes a pair of pick-offs 105, 105' that are affixed to the conduits 103A, 103B. More particularly, a first pick-off component (not shown) is located on the conduits 103A and a second pick-off component (not shown) is located on the conduit 103B. In the example depicted, the pick-offs 105, 105' may be electromagnetic detectors, for example, pick-off magnets and pick-off coils that produce pick-off signals that represent the velocity and position of the conduits 103A, 103B. For example, the pick-offs 105, 105' may supply pick-off signals to the meter electronics 20 via pathways 111, 111'. Those of ordinary skill in the art will appreciate that the motion of the conduits 103A, 103B is proportional to certain characteristics of the flowing material, for example, the mass flow rate and the density of the material flowing through the conduits 103A, 103B.

In the example shown in FIG. 1, the meter electronics 20 receives the pick-off signals from the pick-offs 105, 105'. Path 26 provides an input and an output means that allows one or more meter electronics 20 to interface with an operator. The meter electronics 20 measures a characteristic of the flowing material, such as, for example, a phase difference, a frequency, a time delay, a density, a mass flow rate, a volume flow rate, a totalized mass flow, a temperature, a meter verification, and other information. More particularly, the meter electronics 20 receives one or more signals, for example, from the pick-offs 105, 105' and one or more temperature sensors 130.

Due to the relatively small phase delay as well as the extremely accurate measurements achievable by Coriolis flow meters, the temperature of at least one of the flow conduits is typically measured using a temperature-measuring device, such as a resistance temperature detector (RTD) 130. Unless the process material's temperature is rapidly changing, the temperature of the flow conduit is related to the process material's temperature and is proportional to the thermal impedance between the fluid, the RTD, and the ambient temperature. Therefore, if the temperature of the conduit can be measured, the temperature of the fluid can be determined to within an accepted degree of certainty, which may depend upon the particular application. Therefore, prior art vibrating meters, such as the prior art Coriolis flow meter 10 utilize a well-known RTD 130 to generate a temperature measurement of the flow conduit. In some prior art systems, multiple measurements are taken with multiple RTDs to obtain temperature measurements of the conduit, a case surrounding the conduits, brace bars, etc.

RTDs are widely accepted as providing an accurate temperature measurement. A RTD operates by applying power to the RTD and calculating the resistance of the RTD. This is typically done by supplying a known current through the RTD and measuring the resulting voltage to calculate the resistance. The RTD's resistance is directly proportional to temperature. For example, many RTDs are made from platinum that has a relatively linear temperature coefficient of resistance of approximately 0.00391° C. Therefore, the RTD can be calibrated to provide a temperature based on a determined resistance of the RTD. RTDs have the advantage of being accurate, stable, fairly linear, and have a wide temperature range. However, one of the main disadvantages of using a RTD is the increased cost associated with operation of the RTD. The increased cost is a result of the cost of the RTD itself as well as the signal processing of the low signal levels typical of RTDs. While the increased cost associated with RTDs can be justified in some situations, other situations do not require the constant temperature measurement or the high accuracy provided by an RTD. One such example is in situations where the temperature of the process fluid remains relatively stable. A RTD may not be required in this situation because the anticipated temperature range is relatively limited and temperature influences are reduced compared to density or volume measurements.

Therefore, there exists a need in the art to provide a temperature measurement of at least one of the conduits of a vibrating meter using an existing sensor component. Namely, there exists a need to provide a temperature measurement without requiring an extra component, such as the RTD 130 of the prior art Coriolis flow meter 10. The present invention overcomes these and other problems and an advance in the art is achieved.

SUMMARY OF THE INVENTION

A method for determining a temperature of a vibrating sensor component coupled to a conduit of a vibrating meter is provided according to an embodiment of the invention. The method comprises steps of supplying the vibrating sensor component with a temperature determination signal and measuring a resulting signal. According to an embodiment of the invention, the method further comprises a step of determining a temperature of the sensor component based on the temperature determination signal and the resulting signal.

A method for generating a correlation between a voltage-to-current ratio and temperature of a sensor component coupled to a conduit of a vibrating sensor is provided according to an embodiment of the invention. The method comprises a step of supplying the sensor component with a test signal. The method further comprises steps of measuring a first resulting signal and determining a first voltage-to-current ratio based on the test signal and the resulting signal. According to an embodiment of the invention, the method further comprises steps of measuring a first temperature of the sensor component and storing the first determined voltage-to-current ratio with the first measured temperature.

A meter electronics for a vibrating meter including one or more conduits and one or more sensor components coupled to the one or more conduits is provided according to an embodiment of the invention. The meter electronics includes a processing system configured to supply a sensor component of the one or more sensor components with a temperature determination signal. The processing system is further configured to measure a resulting signal. According to an embodiment of the invention, the method is further configured to determine a temperature of the sensor component based on the temperature determination signal and the resulting signal.

Aspects

According to an aspect of the invention, a method for determining a temperature of a vibrating sensor component coupled to a conduit of a vibrating meter comprises steps of:

supplying the vibrating sensor component with a temperature determination signal;

measuring a resulting signal; and determining a temperature of the sensor component based on the temperature determination signal and the resulting signal.

Preferably, the step of determining the temperature of the sensor component comprises:

determining a voltage-to-current ratio from the temperature determination signal and the measured resulting signal; and     determining the temperature of the sensor based on a correlation between the determined voltage-to-current ratio and temperature.

Preferably, the temperature determination signal comprises an alternating current at a frequency substantially equal to a resonant frequency of the conduit of the vibrating meter including a process fluid and wherein the method further comprises steps of:

removing the temperature determination signal for a predetermined time;

measuring a voltage;

determining a back electromotive force; and compensating the voltage-to-current ratio for the back electromotive force.

Preferably, the temperature determination signal comprises an alternating current at a frequency different from a resonant frequency of the conduit of the vibrating meter including a process fluid.

Preferably, the temperature determination signal comprises an alternating current at a frequency substantially equal to a resonant frequency of the conduit of the vibrating meter including a process fluid.

Preferably, the temperature determination signal comprises an alternating current and the resulting signal comprises a voltage.

Preferably, the temperature determination signal comprises a fixed voltage and the resulting signal comprises a current.

Preferably, the sensor component comprises a driver coil.

Preferably, the sensor component comprises a pick-off sensor coil.

According to another aspect of the invention, a method for generating a correlation between a voltage-to-current ratio and temperature of a sensor component coupled to a conduit of a vibrating sensor comprises steps of:
supplying the sensor component with a test signal;
measuring a first resulting signal;
determining a first voltage-to-current ratio based on the test signal and the resulting signal;
measuring a first temperature of the sensor component; and
storing the first determined voltage-to-current ratio with the first measured temperature.

Preferably, the method further comprises steps of:
measuring a second temperature of the sensor component; and
if the second temperature of the sensor component has changed by more than a threshold amount from the first temperature, measuring a second resulting signal to determine at least a second voltage-to-current ratio; and
storing the second voltage-to-current ratio with the second temperature.

Preferably, the sensor component comprises a driver coil.

Preferably, the sensor component comprises a pick-off sensor coil.

Preferably, the test signal comprises an alternating current and the resulting signal comprises a resulting voltage.

Preferably, the test signal comprises a fixed voltage and the resulting signal comprises a resulting current According to another aspect of the invention, a meter electronics for a vibrating meter including one or more conduits and one or more sensor components coupled to the one or more conduits includes a processing system configured to:
supply a sensor component of the one or more sensor components with a temperature determination signal;
measure a resulting signal; and
determine a temperature of the sensor component based on the temperature determination signal and the resulting signal.

Preferably, the processing system is further configured to:
determine a voltage-to-current ratio based on the temperature determination signal and the resulting signal; and
determine the temperature of the sensor component based on a correlation between the determined voltage-to-current and temperature.

Preferably, the temperature determination signal comprises an alternating current at a frequency substantially equal to a resonant frequency of the conduit of the vibrating meter including a process fluid and wherein the processing system is further configured to:
remove the temperature determination signal for a predetermined time;
measure a voltage;
determine a back electromotive force; and
compensate the voltage-to-current ratio for the back electromotive force.

Preferably, the temperature determination signal comprises an alternating current at a frequency different from a resonant frequency of the conduit of the vibrating meter including a process fluid.

Preferably, the temperature determination signal comprises an alternating current at a frequency substantially equal to a resonant frequency of the conduit of the vibrating meter including a process fluid.

Preferably, the temperature determination signal comprises an alternating current and the resulting signal comprises a voltage.

Preferably, the temperature determination signal comprises a fixed voltage and the resulting signal comprises a current.

Preferably, the sensor component comprises a drive coil.

Preferably, the sensor component comprises a pick-off coil.

DETAILED DESCRIPTION OF THE INVENTION

FIGS. 2-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 2:
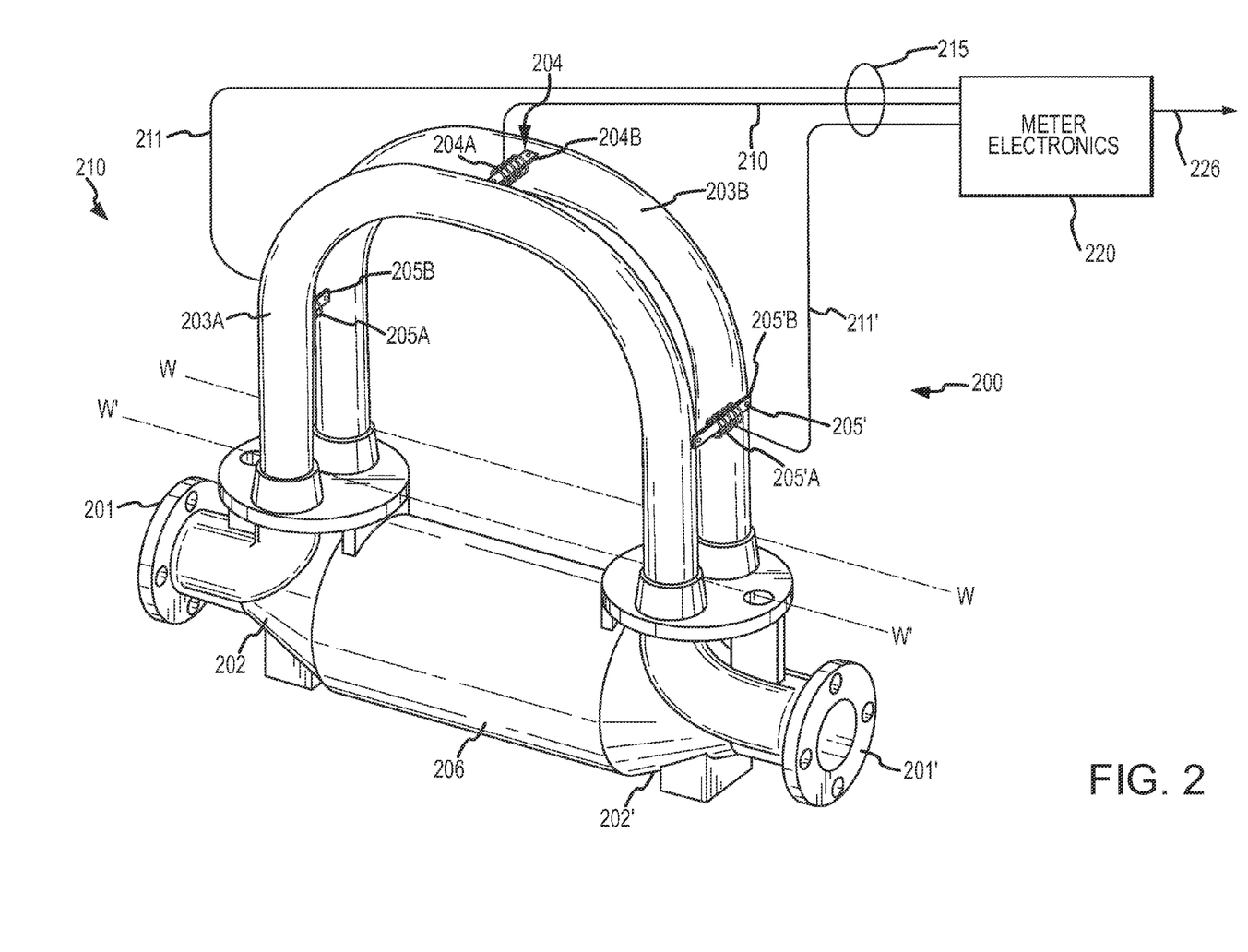
FIG. 2 a vibrating meter according to an embodiment of the invention.

FIG. 2 shows a vibrating meter 200 in the form of a meter comprising a sensor assembly 210 and one or more meter electronics 220. The vibrating meter 200 may comprise a Coriolis flow meter, a volumetric flow meter, a vibrating densitometer, etc. Therefore, the present invention should not be limited to Coriolis flow meters. The meter electronics 220 is connected to the sensor assembly 210 via leads 215 to measure one or more characteristics of a substance, such as, for example, a fluid density, a mass flow rate, a volume flow rate, a totalized mass flow, a temperature, and other information over path 226. Components in common with the prior art flow meter 5 share similar reference numbers, however start with a "2" rather than a "1". For example, the prior art conduits were labeled 103A and 103B while the conduits of the present invention are labeled 203A and 203B.

Furthermore, the driver 204 is shown as comprising a first part 204A and a second part 204B. In one example embodiment, the first part 204A comprises a coil while the second part 204B comprises a magnet. The first and second parts 204A, 204B are coupled to the conduits 203A, 203B, respectively according to well-known techniques, such as brazing, bonding, welding, adhesives, mechanical fasteners, etc. It should be appreciated that the first and second parts 204A, 204B are not limited to a magnet-coil combination, but rather may comprise other known driver systems that receive an electrical drive signal and experience an electrical resistance that can be correlated to temperature as described below. Another example may comprise a piezo-electric driver system. Therefore, while the description discusses driver and pick-off coils 204A, 205A, 205'A, it should be appreciated that other types of sensor components may be used. In addition to the driver 204 being shown as comprising two separate components, the pick-off sensors 205, 205' are shown as comprising first and second parts 205A, 205B, 205'A, and 205'B. Similar to the driver 204, the pick-off sensors 205, 205' may comprise magnet-coil combinations with the coil comprising the first parts 205A, 205'A and the magnet comprising the second part 205B, 205'B.

Although the vibrating meter 200 is shown as comprising two conduits 203A, 203B, it should be appreciated that the vibrating meter 200 may comprise more or less than two conduits. For example, if the vibrating meter 200 comprises a single conduit system, the first parts of the driver and pick-offs 204A, 205A, 205'A can be coupled to the conduit while the second parts 204B, 205B, and 205'B can be coupled to a stationary object, for example. Therefore, the portion of the driver 204 and pick-offs 205, 205' that communicate with the meter electronics 220 via the leads 210, 211, 211' can be coupled to the single conduit. Further, while the conduits 203A, 203B are shown as comprising curved conduits, the vibrating meter 200 may comprise a straight conduit configuration.

The vibrating meter 200 operates in much the same way as the prior art flow meter 5, with the exception of obtaining a temperature measurement of one or more of the conduits 203A, 203B. As discussed above, prior art vibrating meters determine temperature by coupling a RTD to the conduit and applying a current to the RTD and measuring the resulting voltage. The resulting voltage along with the applied current are used to determine a resistance of the RTD. The resistance of the RTD is then correlated to a specific temperature. As can be seen, the vibrating meter 200 of the present invention does not include a RTD. Advantageously, the cost associated with RTDs as well as the wiring and circuitry is eliminated. However, a temperature measurement may be desired with the vibrating meter 200 of the present invention, which according to an embodiment of the invention can be obtained by determining a temperature of one or more of the sensor components as described in more detail below. As used in the present application, "sensor components" comprise transducers used for imposing vibrations on or receiving vibrations from one or more of the vibrating conduits 203A, 203B. Examples of sensor components are drive coils, such as the drive coil 204, pick-off coils, such as the pick-off coils 205A, 205'A, photodiode pick-off sensors, piezo-electric drivers, etc. The temperature of at least one of the vibrating sensor components 204A, 205A, 205'A can be determined according to one or more operating routines as provided by the meter electronics 220. From the temperature of the sensor component, the temperature of the conduit 203A, 203B as well as the process fluid within the conduits 203A, 203B can be determined.

Figure 3:
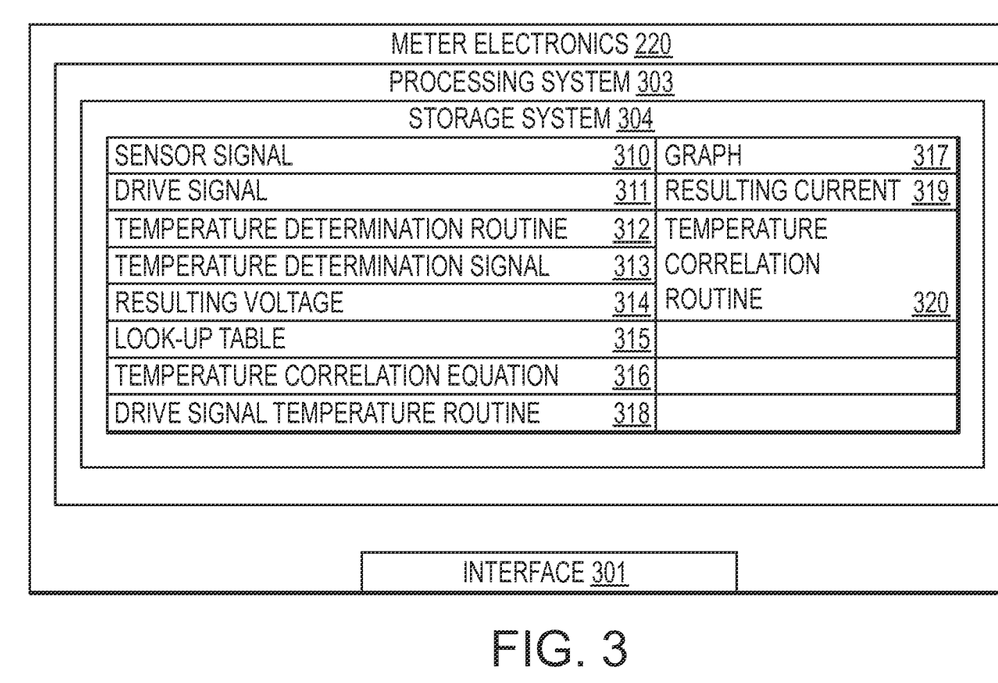
FIG. 3 shows a meter electronics according to an embodiment of the invention.

FIG. 3 shows the meter electronics 220 according to an embodiment of the invention. The meter electronics 220 can include an interface 301 and a processing system 303. The processing system 303 may include a storage system 304. The storage system 304 may comprise an internal memory as shown, or alternatively, may comprise an external memory. The meter electronics 220 can generate a drive signal 311 and supply the drive signal 311 to the driver 204, and more specifically, the drive coil 204A via lead 210 shown in FIG. 2. The meter electronics 220 can also generate a temperature determination signal 313 and supply the temperature determination signal 313 to the drive coil 204A. In addition, the meter electronics 220 can receive sensor signals 310 from the flow meter 210, such as from the pick-off sensors 205, 205' via leads 211, 211' shown in FIG. 2. In some embodiments, the sensor signals 310 may be received from the driver 204. Such a configuration is known from U.S. Pat. No. 6,230,104, assigned on its face to Micro Motion, Inc., which is hereby incorporated by reference. The meter electronics 220 can operate as a densitometer or can operate as a mass flow meter, including operating as a Coriolis mass flow meter. It should be appreciated that the meter electronics 220 may also operate as some other type of vibrating sensor assembly and the particular examples provided should not limit the scope of the present invention. The meter electronics 220 can process the sensor signals 310 in order to obtain one or more flow characteristics of the material flowing through the conduits 203A, 203B. In some embodiments, the meter electronics 220 may also process the sensor signals 310 to determine a voltage-to-current ratio (V/I) in order to determine a temperature of one or more of the driver 204 or the pick-offs 205, 205' as discussed in more detail below.

The interface 301 can receive the sensor signals 310 from the driver 204 or the pick-off sensors 205, 205', via leads 210, 211, 211'. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 220 and external devices. The interface 301 can be capable of any manner of electronic, optical, or wireless communication.

The interface 301 in one embodiment can include a digitizer (not shown), wherein the sensor signals 310 comprise analog sensor signals. The digitizer can sample and digitize the analog sensor signals and produce digital sensor signals. The digitizer can also perform any needed decimation, wherein the digital sensor signal is decimated in order to reduce the amount of signal processing needed and to reduce the processing time.

The processing system 303 can conduct operations of the meter electronics 220 and process flow measurements from the flow meter 210. The processing system 303 can execute the data processing required to implement one or more processing routines, such as the temperature determination routine 313, the drive signal temperature routine 318, and the temperature correlation routine 320, as well as process the flow measurements in order to produce one or more flow characteristics that are compensated for temperature.

The processing system 303 can comprise a general-purpose computer, a micro-processing system, a logic circuit, or some other general purpose or customized processing device. The processing system 303 can be distributed among multiple processing devices. The processing system 303 can include any manner of integral or independent electronic storage medium, such as the storage system 304.

It should be understood that the meter electronics 220 may include various other components and functions that are generally known in the art. These additional features are omitted from the description and the figures for the purpose of brevity. Therefore, the present invention should not be limited to the specific embodiments shown and discussed.

As the processing system 303 generates the various flow characteristics, such as for example, the mass flow rate or the volume flow rate, an error may be associated with the generated characteristic due to a change in the temperature of the process fluid, the conduits 203A, 203B, or both. For example, a change in the conduits' temperature can affect the meter's flow calibration factor (FCF) that is used to generate a mass flow rate according to equation (1), for example.

$$\dot{m} = FCF(\Delta t_{measured} - \Delta t_0) \quad (1)$$

Where:
$\dot{m}$ is the mass flow rate;
FCF is the flow calibration;
$\Delta t_{measured}$ is the measured time delay between the pick-offs 205, 205'; and
$\Delta t_o$ is the initial time delay between the pick-offs at zero flow.

The flow calibration factor is affected by the modulus of elasticity of the conduits 203A, 203B, among other things. The modulus of elasticity of the conduits 203A, 203B changes with temperature. Therefore, if the temperature of the conduits 203A, 203B is not accounted for, the flow calibration factor may not be accurate, resulting in inaccurate flow rate measurements.

As discussed above in relation to FIG. 1, while operating the vibrating meter 200, a drive signal 311, generally in the form of an alternating current, can be provided by the meter electronics 220 to excite the coil of the driver 204 via the pathway 210. Because the resistance of the coil 204A used for the driver 204 changes with temperature in a similar manner to a RTD, if the resistance (or impedance when using an alternating current) of the coil, which is coupled to one of the conduits 203A, 203B, can be determined, the temperature of the coil can also be determined based on a previously calculated correlation, for example. Once the system reaches a steady state, the temperature of the coil is substantially equal to the temperature of the conduit 203A, 203B. Steady state can be achieved rapidly when the conduits are well insulated by a meter case (not shown), for example. Once a steady state is reached with the temperature of the process fluid, the temperature of the conduits 203A, 203B may be substantially equal to the temperature of the process fluid.

According to one embodiment, the driver 204 and lead 210 can be described as a circuit that is excited with an alternating current applied in the form of the drive signal 311 and/or a temperature determination signal 313. According to Ohm's law, when an alternating current is applied to the circuit, the resulting voltage is dependent upon the circuit's impedance, in this case the impedance of the driver coil 204A. This can be seen in equation (2).

$$V = (R + j\pi f L)I \quad (2)$$

Where:
V is the voltage;
R is the resistance;
j is the square root of $-1$;

f is the frequency of the alternating current;
L is the inductance of the coil 204A; and
I is the current.

Equation (2) can be rearranged to solve for impedance $(R + j2\pi L)$.

According to another embodiment of the invention, the coil can be excited with a direct current rather than an alternating current. As can be appreciated, if a direct current is used, equation (2) reduces to equation (3) because the DC signal does not produce any inductance.

$$V = RI \quad (3)$$

According to another embodiment of the invention, in order to simplify the calculation when applying an alternating current to the drive coil 204A, the inductive reactance term $(j2\pi f L)$ can be ignored. This may be acceptable when the frequency of the alternating current is relatively low, resulting in the resistance term being substantially larger. For example, a typical drive signal 311 may be at approximately 250 Hz, but if the signal provided to the coil to determine a temperature is reduced to approximately 100 Hz, the inductive reactance term may be ignored. Consequently, because the impedance can often be simplified to resistance, the remainder of the description refers to the voltage-to-current ratio (V/I) in terms of "resistance" even if an AC signal is provided, unless otherwise specified. Those skilled in the art will readily recognize that if greater precision is desired, the inductance of the coil 204A can be taken into account by using a known inductance, L, for the applied signal or calculating the inductive reactance term $(j2\pi f L)$ based on the frequency of the AC signal and the inductance of the coil as determined during an initial calibration, for example.

According to an embodiment of the invention, the temperature of at least one of the conduits 203A, 203B can be determined according to one of the methods that follow. In each of the methods described below, the temperature is determined from the temperature determination signal, which may comprise the drive signal, and the measured resulting signal. According to an embodiment of the invention, the temperature is determined from a correlation between a V/I ratio and temperature of the associated sensor component rather than a correlation between a resistance of a RTD and temperature. Advantageously, the present invention utilizes an existing sensor component to determine the temperature.

According to one embodiment of the invention, the meter electronics 220 can be configured to determine a temperature of at least one of the sensor components 204A, 205A, 205'A according to a temperature determination routine 312.

Figure 4:
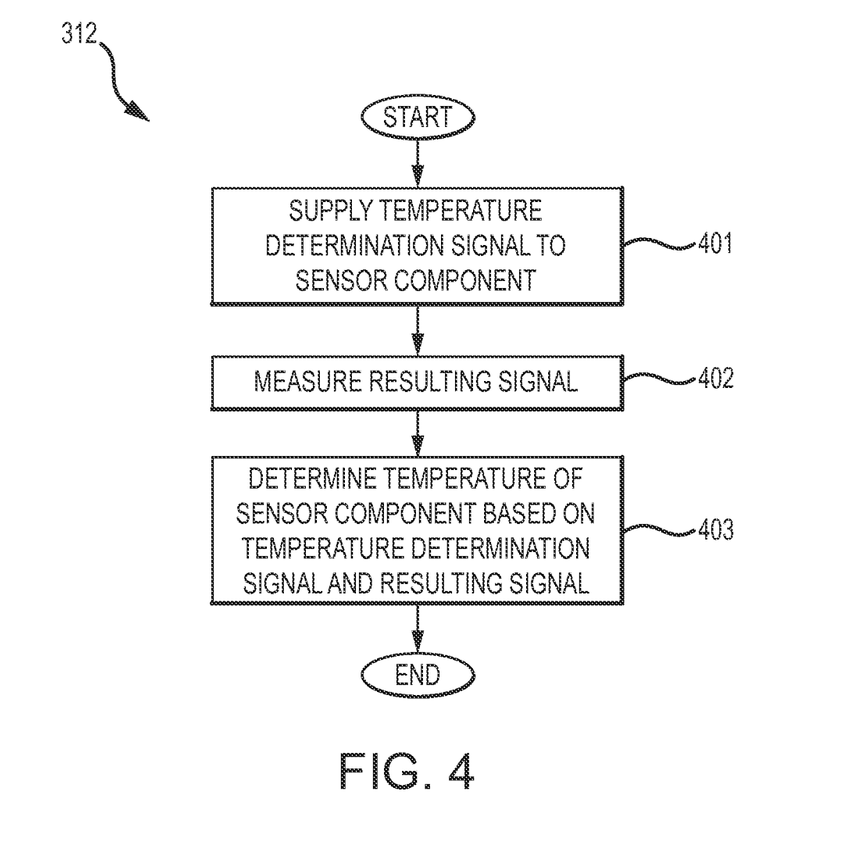
FIG. 4 shows a temperature determination routine according to an embodiment of the invention.

FIG. 4 shows the temperature determination routine 312 according to an embodiment of the invention. The temperature determination routine 312 starts in step 401 where a sensor component is supplied with a temperature determination signal 313. According to an embodiment of the invention, the sensor component comprises the drive coil 204A. According to another embodiment of the invention, the sensor component comprises a pick-off coil, such as the pick-off coil 205A or 205'A. Therefore, in some embodiments, the meter electronics 220 can be configured to both supply a signal to the pick-offs 205, 205' and receive a signal from the pick-offs 205, 205'. Although the temperature determination routine 312 is described as supplying the signal to the drive coil 204A for consistency, the present invention should not be so limited.

According to an embodiment of the invention, the temperature determination signal 313 is different than the drive signal 311 supplied to the drive coil 204A during normal operations. However, according to other embodiments, the temperature determination signal comprises the drive signal 311. The temperature determination signal 313 may be supplied to the drive coil 204A instead of the drive signal 311 or in addition to the drive signal 311. For example, the temperature determination signal 313 may be superimposed upon the drive signal 311. Alternatively, if the temperature determination signal 312 is supplied to one of the pick-off sensors 205, 205', the drive signal 311 can still be supplied to the driver 204.

According to an embodiment of the invention, the temperature determination signal 313 comprises an alternating current with a known amplitude and frequency. However, in other embodiments, the temperature determination signal 313 may comprise a fixed voltage instead. According to an embodiment of the invention, the temperature determination signal 313 comprises a frequency that is different from a resonance frequency of the fluid-filled conduits, which typically comprises the frequency of the drive signal 311. Preferably, the temperature determination signal 313 is at a frequency below the drive signal 311; however, the temperature determination signal 313 may comprise a frequency higher than the drive signal 311. For example, for U-shaped conduits as shown in FIG. 2, the drive signal 311 is typically provided at around 250 Hz (the drive signal may approach or exceed 1000 Hz for a straight-conduit vibrating meter). However, according to an embodiment of the invention, the temperature determination signal 313 can be provided at around 100 Hz.

In step 402, the resulting signal is measured. According to embodiments where the temperature determination signal comprises an alternating current or a direct current, the resulting signal can comprise a voltage $V_C$ across the coil 204A. The voltage across the coil, $V_C$ may be determined using a voltmeter (not shown), for example. The voltmeter may comprise an integral component of the meter electronics 220 or comprise an external component. Alternatively, if the temperature determination signal 313 comprises a fixed voltage, the resulting signal can comprise a current and can be measured with an ammeter, for example. In yet another embodiment, the resulting signal may comprise a resistance that may be determined using an ohmmeter (not shown), for example. The voltage, $V_C$ is discussed for the purpose of consistency.

Based on the temperature determination signal and the resulting signal, the temperature of the sensor component can be determined in step 403. According to an embodiment of the invention, the temperature of the sensor component can be determined based on a voltage-to-current ratio, V/I. Using equation (3) above, the voltage-to-current ratio can be reduced to a resistance of the drive coil 204A. The V/I ratio may be reduced to resistance or impedance. In either case the V/I ratio will vary with temperature. Therefore, the temperature can be correlated to a determined V/I ratio using look-up tables, charts, graphs, equations, etc. The correlation can be stored in the storage system 304 and retrieved when needed. Therefore, as shown in FIG. 3, the storage system 304 can include a look-up table 315, a temperature correlation equation 316, or a graph 317. An example of a suitable correlating equation is provided in equation (4).

$$R=R_{ref}[1+\alpha(T-T_{ref})] \quad (4)$$

Where:
R is the determined resistance;
$R_{ref}$ is a resistance at a reference temperature;
α is the temperature coefficient of resistance for the conductor material;
T is the temperature; and
$T_{ref}$ is the reference temperature.

Therefore, if a reference resistance for the drive coil 204A is determined at a reference temperature during an initial calibration, equation (4) can be rearranged to solve for T based on the resistance determined in step 403. The temperature coefficient of resistance, α of the drive coil 204A will be based on the material used for the drive coil, which is typically copper or a similar known metal or alloy. Copper has a temperature coefficient of resistance, α, of approximately 0.004/° C. As an example calculation, if the drive coil 204A comprises copper, and $R_{ref}$ at a reference temperature of 20° C. was determined to be 25 ohms. With a current of 0.005 A supplied, the measured reference voltage at 20° C. was 0.125 volts, which gave the reference resistance of 25 Ohms (0.125V/0.005A). If the same current of 0.005 A is provided to the drive coil 204A and a voltage of 0.152 volts is measured, the resistance of the drive coil 204A has increased to 30.4 ohms. Using equation (4), rearranged to solve for temperature, the coil temperature is therefore 74.0° C. If a steady-state situation has been reached, the temperature of the drive coil 204A is approximately equal to the temperature of the conduit 203B as discussed above, which is related to temperature of the process fluid. Therefore, the temperature determination routine 312 can be used to obtain a temperature measurement of the conduit 203B utilizing the sensor component, in this case, the drive coil 204A. In addition, with a steady state, the temperature of the conduit 203B will be approximately equal to the temperature of the process material in the conduit, thereby giving a good estimate of the process fluid temperature within the conduits.

Figure 5:
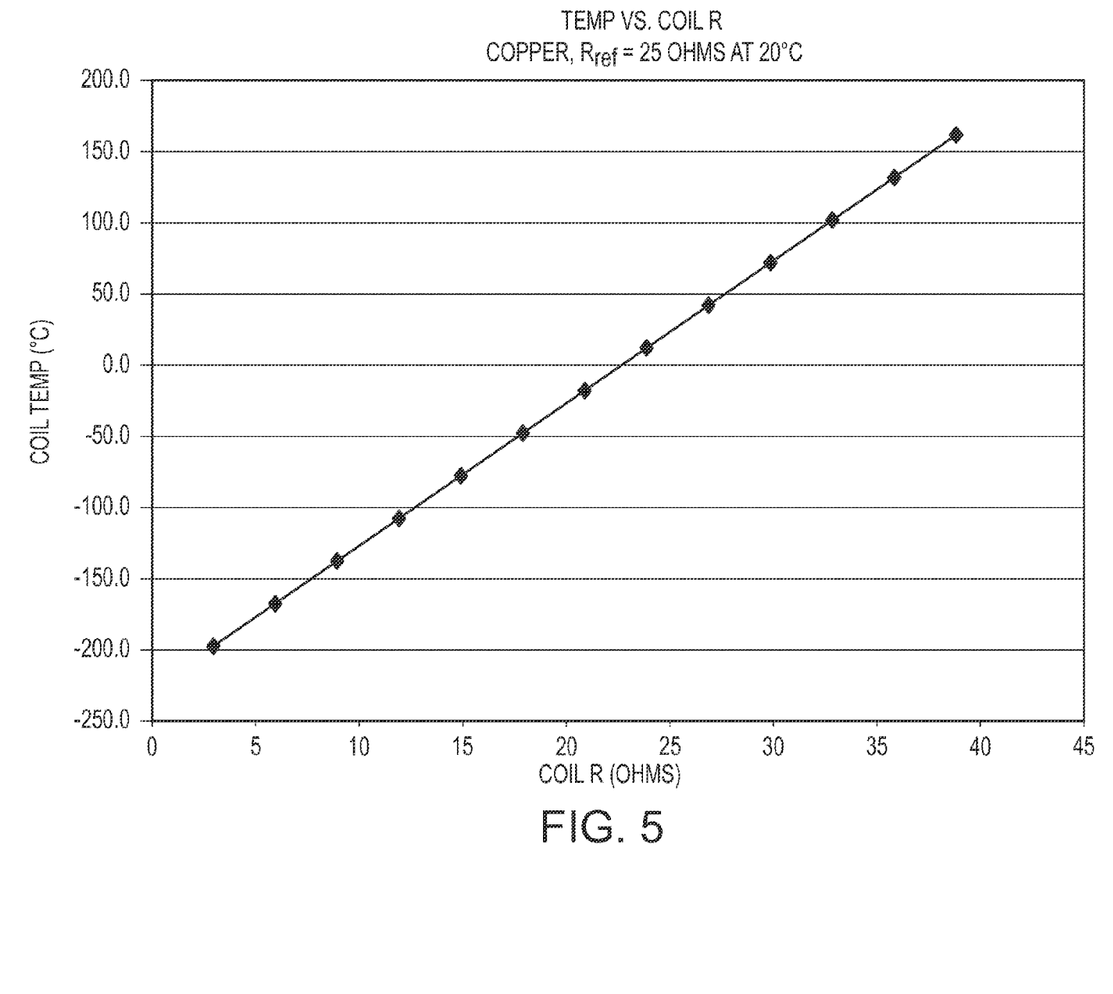
FIG. 5 shows a graph of a correlation between resistance and temperature for a drive coil according to an embodiment of the invention.

As mentioned above, the temperature may also be correlated to V/I or resistance, using a graph. FIG. 5 shows a correlation graph 500 that relates a coil resistance to a coil temperature. Therefore, in some embodiments, the temperature determination signal can be supplied to the sensor component and the resulting signal can comprise a resistance as determined by an ohmmeter (not shown). The ohmmeter may comprise an integral or an external component to the meter electronics 220. The correlation graph 500 may therefore provide a direct correlation between a coil resistance as determined by the ohmmeter and the coil temperature without the need to determine a V/I ratio.

Another correlation may be in the form of a look-up table as provided in table 1 below.

TABLE 1

| Coil R (Ohms) | Temp (° C.) |
|---|---|
| 3 | −200.0 |
| 6 | −170.0 |
| 9 | −140.0 |
| 12 | −110.0 |
| 15 | −80.0 |
| 18 | −50.0 |
| 21 | −20.0 |
| 24 | 10.0 |
| 27 | 40.0 |
| 30 | 70.0 |
| 33 | 100.0 |
| 36 | 130.0 |
| 39 | 160.0 |

Table 1 may be generated during an initial calibration routine wherein the coil is subjected to various predetermined temperatures, using an oven, for example. The temperature may alternatively or additionally be confirmed with a temperature-measuring device, such as a RTD. Table 1 was generated using the same applied current as described above for the equation correlation. As can be appreciated, the temperature can be obtained by interpolation using the determined resistance of 30.4 Ohms gives a temperature of 74.0° C.

$$\left(70 + \frac{(100-70)}{(33-30)}(30.4-30) = 74\right).$$

While the examples above provide a correlation between resistance and temperature, other correlations may be used. For example, a similar correlation can alternatively be provided between impedance and temperature in order to take into account the inductive reactance term in equation (2). Therefore, in some embodiments, the value of interest is the ratio of V/I, and not necessarily only the resistance. Therefore, the look-up table or graph may comprise a correlation of V/I vs. temperature. However, if this approach is used, a more accurate calibration can be obtained if the current is at the same frequency and amperage during the generation of the correlation as it is during the operation in order to account for the inductive reactance term of equation (2), which varies with the coil's inductance and frequency.

In the example above, the temperature determination signal 313 comprised an alternating current at a frequency different from the drive signal frequency 311. According to another embodiment of the invention, the temperature determination signal 313 can supply the sensor component with a fixed voltage instead. According to this embodiment, the resulting current could be measured using an ammeter rather than the voltage in order to determine the voltage-to-current ratio (V/I). According to yet another embodiment, the temperature determination signal 313 can comprise a DC signal. In this embodiment, the impedance is effectively zero and does not need to be estimated or neglected.

According to another embodiment of the invention, the meter electronics 220 can utilize the drive signal 311 to determine the temperature of the drive coil 204A using a drive signal temperature routine 317 rather than supplying a secondary signal. In other words, the temperature determination signal 313 can comprise the drive signal 311.

Figure 6:
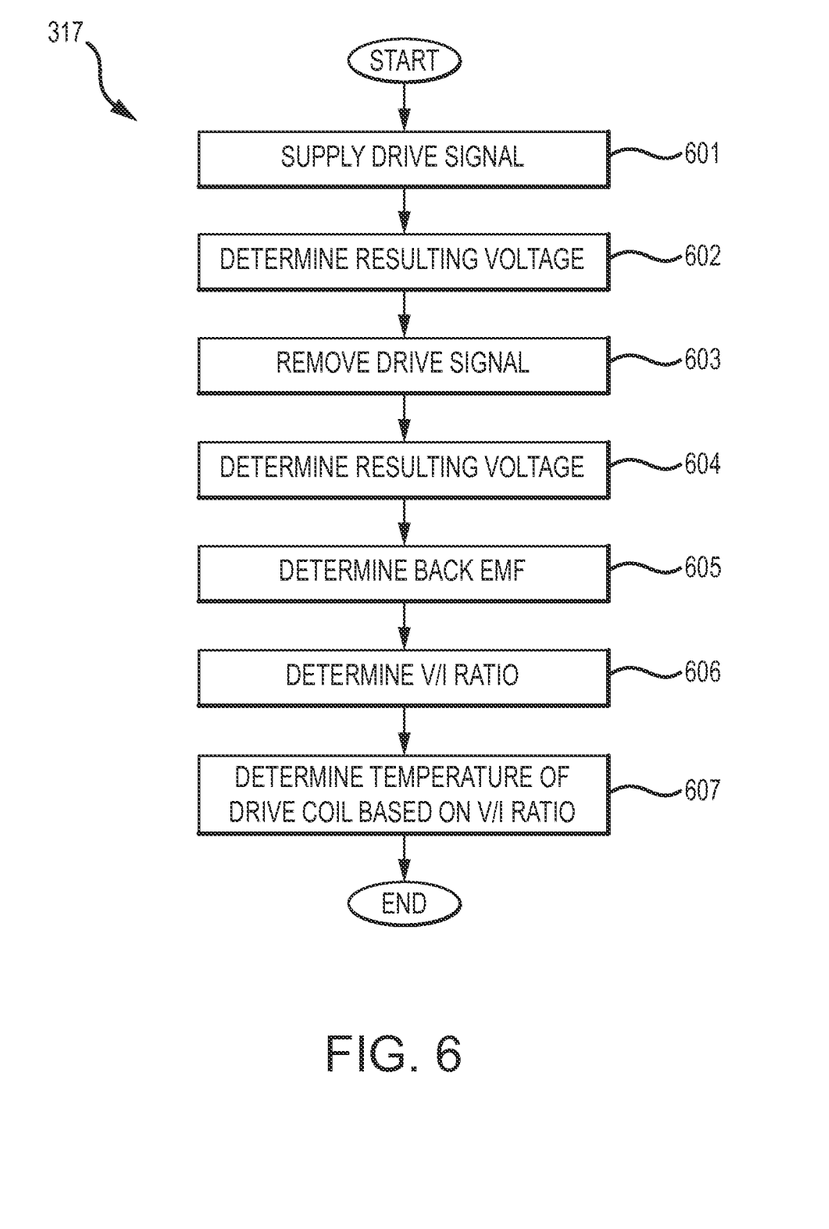
FIG. 6 shows a drive signal temperature routine according to an embodiment of the invention.

FIG. 6 shows the drive signal temperature routine 317 according to an embodiment of the invention. According to an embodiment of the invention, the meter electronics 220 can be configured to perform the drive signal temperature routine 317. According to an embodiment of the invention, the drive signal temperature routine 317 starts in step 601 where a temperature determination signal is supplied to the drive coil 204A. According to an embodiment of the invention, the temperature determination signal may comprise the drive signal 311 supplied to the drive coil 204A. According to an embodiment of the invention, the drive signal 311 can comprise an alternating current with a known amplitude and frequency. The drive signal 311 used in the drive signal temperature routine 317 may comprise the same drive signal 311 used during normal operation of the vibrating meter 200. The drive signal 311 can be provided to vibrate the one or more conduits 203A, 203B at a resonant frequency of the process fluid filled conduit.

In step 602, the resulting voltage is determined as discussed above.

In step 603, the drive signal 311 is removed for a predetermined time. The drive signal 311 is dropped to zero because the drive signal 311 is supplied at a resonant frequency of the fluid filled conduits. Consequently, with the drive signal 311 supplied to the drive coil 204A, the conduits 203A, 203B are vibrating at a resonant frequency. As a result, the measured voltage $V_C$ is influenced by the drive signal current, the resistance across the drive coil, the inductance of the drive coil as well as back electromotive force (EMF), which is a voltage that opposes the current as provided in equation (5).

$$V_C = I(R + j2\pi f L) + \text{back } EMF \tag{5}$$

Where:
$V_C$ is the voltage;
I is the current;
R is the resistance;
j is the square route of −1;
f is the drive signal frequency; and
L is the drive coil inductance.

The back EMF is present because the conduits are vibrating at resonance. Therefore, if the drive signal 311 is temporarily removed, R, L, and I drop to zero.

In step 604, a voltage across the drive coil 204A can be determined once again. The voltage, $V_C$, can be determined in a similar manner as described above in step 402. With the drive signal 311 temporarily removed and the voltage measured again, the back EMF can be determined in step 605. With the back EMF determined, the V/I ratio using the voltage determined in step 602 can be compensated for the back EMF to determine the coil's resistance. For example, the correlation between the V/I ratio and temperature may not include the back EMF. Therefore, the back EMF can be subtracted out of the V/I ratio to obtain the correct V/I ratio to be used with the correlation.

In step 606, the resistance of the drive coil 204A is determined. More specifically, the ratio of V/I is determined. As with the previously described embodiment, while "resistance" is described, if the inductance, L of the drive coil is known, the impedance can be calculated rather than the resistance.

In step 607, the temperature of the drive coil 204A can be determined as discussed above.

Figure 7:
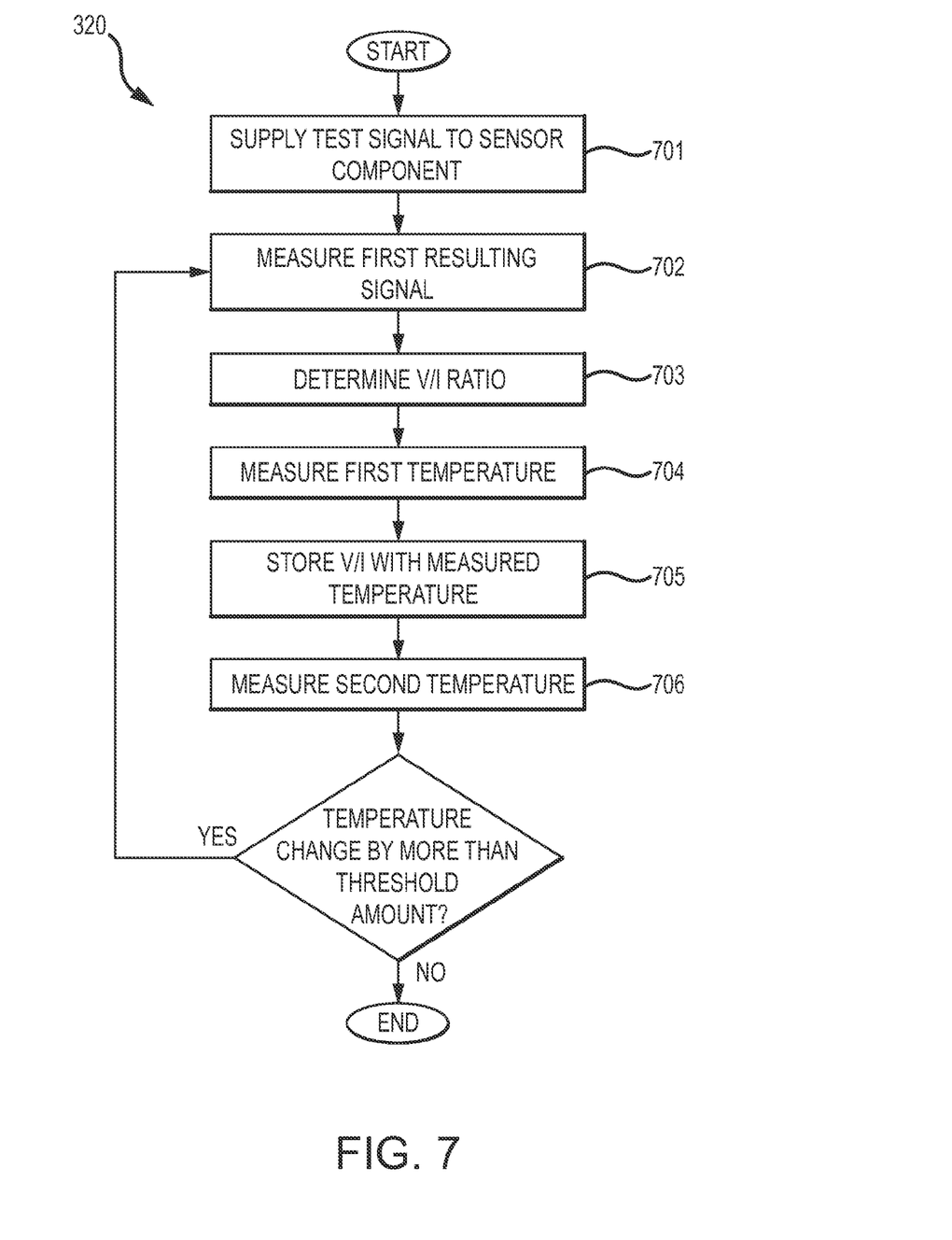
FIG. 7 shows a temperature correlation routine according to an embodiment of the invention.

In the embodiments discussed above, the correlation between V/I and temperature or some variance thereof was previously determined. However, it may be desirable to update or perform an initial correlation on a vibrating meter according to the correlation routine 320 described below.

FIG. 7 shows a correlation routine 320 according to an embodiment of the invention. The correlation routine 330 may be performed by the meter electronics 220, for example. The correlation routine 330 may be performed by a user or operator. The correlation routine 330 may be performed by a manufacturer. The correlation routine 320 can be performed in order to generate a correlation between a V/I ratio and a temperature of one or more of the vibrating meter's sensor components. For example, the correlation routine 320 can be performed in order to generate a correlation between a resistance of the drive coil 204A and the temperature of the drive coil 204A.

The correlation routine 320 starts in step 701 where a test signal is supplied to the sensor component, in this case a driver coil 204A is assumed. The test signal may comprise an alternating current, for example. Alternatively, the test signal may comprise a fixed voltage or a direct current.

In step 702, a first resulting signal is measured. The resulting signal may comprise a voltage in the case where the test signal comprises an alternating current. Alternatively, the resulting signal may comprise a measured current if a fixed voltage is supplied as the test signal.

In step 703, a first V/I ratio is determined based on the test signal and the first resulting signal. In some embodiments, the V/I ratio may comprise a resistance of the sensor component. In other embodiments, the V/I ratio may comprise an impedance of the sensor component. In yet other embodiments, the V/I ratio may comprise a combination of resistance and/or impedance and/or back EMF.

In step 704, a first temperature is measured. The temperature may be measured from a temperature-measuring device such as a RTD or a thermocouple, for example. The temperature-measuring device may be coupled to the sensor component or positioned proximate the sensor component. In some embodiments, the correlation routine 320 may occur when a steady state has been reached such that the temperature of the temperature-measuring device comprises the temperature of the sensor component. The temperature may also be ensured by operating the calibration in an oven.

In step 705, the first V/I ratio is stored with the first measured temperature.

In step 706, the temperature is measured once again to obtain a second temperature measurement. If the second temperature is different from the first measured temperature by more than a threshold amount, the correlation routine 320 may return to step 702 where a second resulting signal is determined. If the second temperature is the same as the previously measured temperature, or within a threshold difference, the correlation routine 320 may end. The temperature of the system can be varied in order to obtain a plurality of correlations between the V/I ratio and temperature. The plurality of correlations can be stored in a variety of ways including tables, charts, graphs, equations, etc., which can be retrieved during use in order to determine the temperature of the sensor component.

The present invention as described above provides a method and apparatus for determining a temperature of a sensor component of a vibrating meter. In contrast to prior art approaches that require the use of an additional component, such as a RTD, the present invention utilizes a correlation between V/I and temperature for the sensor component itself. Advantageously, the temperature of the sensor component can be determined, which may then be utilized to determine a temperature of the conduit to which the sensor component is coupled. By eliminating the need for a RTD, the cost associated with the RTD as well as the wiring can be eliminated.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating meters, and not just to the embodiments described above and shown in the accompanying figures.

Accordingly, the scope of the invention should be determined from the following claims.

I claim:

1. A method for determining a temperature of a sensor component coupled to a conduit of a vibrating meter, comprising steps of:
   supplying the sensor component coupled to the conduit of the vibrating meter with a temperature determination signal;
   measuring a resulting signal; and
   determining a temperature of the sensor component based on the temperature determination signal and the resulting signal.

2. The method of claim 1, wherein the step of determining the temperature of the sensor component comprises:
   determining a voltage-to-current ratio from the temperature determination signal and the measured resulting signal; and
   determining the temperature of the sensor component based on a correlation between the determined voltage-to-current ratio and temperature.

3. The method of claim 2, wherein the temperature determination signal comprises an alternating current at a frequency substantially equal to a resonant frequency of the conduit of the vibrating meter including a process fluid and wherein the method further comprises steps of:
   removing the temperature determination signal for a predetermined time;
   measuring a voltage;
   determining a back electromotive force; and
   compensating the voltage-to-current ratio for the back electromotive force.

4. The method of claim 1, wherein the temperature determination signal comprises an alternating current at a frequency different from a resonant frequency of the conduit of the vibrating meter including a process fluid.

5. The method of claim 1, wherein the temperature determination signal comprises an alternating current at a frequency substantially equal to a resonant frequency of the conduit of the vibrating meter including a process fluid.

6. The method of claim 1, wherein the temperature determination signal comprises an alternating current and the resulting signal comprises a voltage.

7. The method of claim 1, wherein the temperature determination signal comprises a fixed voltage and the resulting signal comprises a current.

8. The method of claim 1, wherein the sensor component comprises a driver coil.

9. The method of claim 1, wherein the sensor component comprises a pick-off sensor coil.

10. A method for generating a correlation between a voltage-to-current ratio and temperature of a sensor component coupled to a conduit of a vibrating sensor, comprising steps of:
    supplying the sensor component coupled to the conduit of the vibrating sensor with a test signal;
    measuring a first resulting signal;
    determining a first voltage-to-current ratio based on the test signal and the resulting signal;
    measuring a first temperature of the sensor component; and
    storing the first determined voltage-to-current ratio with the first measured temperature.

11. The method of claim 10, further comprising steps of:
    measuring a second temperature of the sensor component; and if the second temperature of the sensor component has changed by more than a threshold amount from the first temperature, measuring a second resulting signal to determine at least a second voltage-to-current ratio; and storing the second voltage-to-current ratio with the second temperature.

12. The method of claim 10, wherein the sensor component comprises a driver coil.

13. The method of claim 10, wherein the sensor component comprises a pick-off sensor coil.

14. The method of claim 10, wherein the test signal comprises an alternating current and the resulting signal comprises a voltage.

15. The method of claim 10, wherein the test signal comprises a fixed voltage and the resulting signal comprises a current.

16. A meter electronics (220) for a vibrating meter (200) including one or more conduits (203A, 203B) and one or more sensor components (204A, 205A, 205'A) coupled to the one or more conduits (203A, 203B), and including a processing system (303) configured to:
supply a sensor component (204A, 205A, 205'A) of the one or more sensor components (204A, 205A, 205'A) coupled to the one or more conduits (203A, 203B) of the vibrating meter with a temperature determination signal;
measure a resulting signal; and
determine a temperature of the sensor component based on the temperature determination signal and the resulting signal.

17. The meter electronics (220) of claim 16, wherein the processing system (303) is further configured to:
determine a voltage-to-current ratio based on the temperature determination signal and the resulting signal; and
determine the temperature of the sensor component based on a correlation between the determined voltage-to-current ratio and temperature.

18. The meter electronics (220) of claim 17, wherein the temperature determination signal comprises an alternating current at a frequency substantially equal to a resonant frequency of the conduit of the vibrating meter including a process fluid and wherein the processing system (303) is further configured to:
remove the temperature determination signal for a predetermined time;
measure a voltage;
determine a back electromotive force; and
compensate the voltage-to-current ratio for the back electromotive force.

19. The meter electronics (220) of claim 16, wherein the temperature determination signal comprises an alternating current at a frequency different from a resonant frequency of the conduit (203A, 203B) of the vibrating meter (200) including a process fluid.

20. The meter electronics (220) of claim 16, wherein the temperature determination signal comprises an alternating current at a frequency substantially equal to a resonant frequency of the conduit (203A, 203B) of the vibrating meter (200) including a process fluid.

21. The meter electronics (220) of claim 16, wherein the temperature determination signal comprises an alternating current and the resulting signal comprises a voltage.

22. The meter electronics (220) of claim 16, wherein the temperature determination signal comprises a fixed voltage and the resulting signal comprises a current.

23. The meter electronics (220) of claim 16, wherein the sensor component comprises a drive coil (204A).

24. The meter electronics (220) of claim 16, wherein the sensor component comprises a pick-off coil (205A, 205'A).

* * * * *

UNITED STATES PATENT AND TRADEMARK OFFICE
CERTIFICATE OF CORRECTION

PATENT NO. : 9,435,695 B2
APPLICATION NO. : 13/809334
DATED : September 6, 2016
INVENTOR(S) : Mansfield Page 1 of 1

It is certified that error appears in the above-identified patent and that said Letters Patent is hereby corrected as shown below:

In the Specification

Column 9, Line 63, replace equation (2) with:

$$V = (R + j2\pi fL)I \qquad (2)$$

Signed and Sealed this
Sixth Day of June, 2017

Michelle K. Lee
*Director of the United States Patent and Trademark Office*